United States Patent [19]

Okano et al.

[11] Patent Number: 5,083,276
[45] Date of Patent: Jan. 21, 1992

[54] SYSTEM FOR CONTROLLING SAFETY DEVICE FOR VEHICLE

[75] Inventors: Masami Okano; Kunihiro Takeuchi; Hideki Ishizuka, all of Higashimatsuyama, Japan

[73] Assignee: Zexel Corporation, Tokyo, Japan

[21] Appl. No.: 573,818

[22] Filed: Aug. 28, 1990

[30] Foreign Application Priority Data

Sep. 6, 1989 [JP] Japan .............................. 1-103931[U]

[51] Int. Cl.$^5$ ............................................ B60R 21/32
[52] U.S. Cl. ............................ 364/424.05; 280/735;
180/271; 340/436; 307/10.1
[58] Field of Search ................... 364/424.05; 180/271,
180/274; 280/728, 734, 735; 340/436, 438;
307/10.1

[56] References Cited

U.S. PATENT DOCUMENTS

| | | | |
|---|---|---|---|
| 4,959,787 | 9/1990 | Morishita et al. | 364/424.05 |
| 4,968,965 | 11/1990 | Naitou et al. | 280/735 |
| 4,985,835 | 1/1991 | Sterler et al. | 364/424.05 |
| 4,994,972 | 2/1991 | Diller | 364/424.05 |
| 4,999,775 | 3/1991 | Muraoka | 280/735 |

FOREIGN PATENT DOCUMENTS 4955031 4/1974 Japan .
63-207755 8/1988 Japan .
63-241467 10/1988 Japan .

Primary Examiner—Gary Chin

[57] ABSTRACT

A system for controlling a safety device for a vehicle includes first and second switching elements connected to a power source in serial relation to the safety device. The control system further includes a pair of acceleration sensors, a pair of analog processing circuits, and a microcomputer. In accordance with an deceleration signal from the corresponding acceleration sensor, each analog processing circuit outputs a collision decision signal. In accordance with the signals from the acceleration sensors, the microcomputer makes calculations to output two collision decision signals respectively from two output ports thereof. The control system further includes two logic elements. One of the logic elements, when simultaneously receiving any two out of the above four collision decision signals, turns on one of the two switching elements. The other logic element, when simultaneously receiving the other two collision decision signals, turns on the other switching element. When both of the two switching elements are turned on, the safety device is operated.

8 Claims, 2 Drawing Sheets

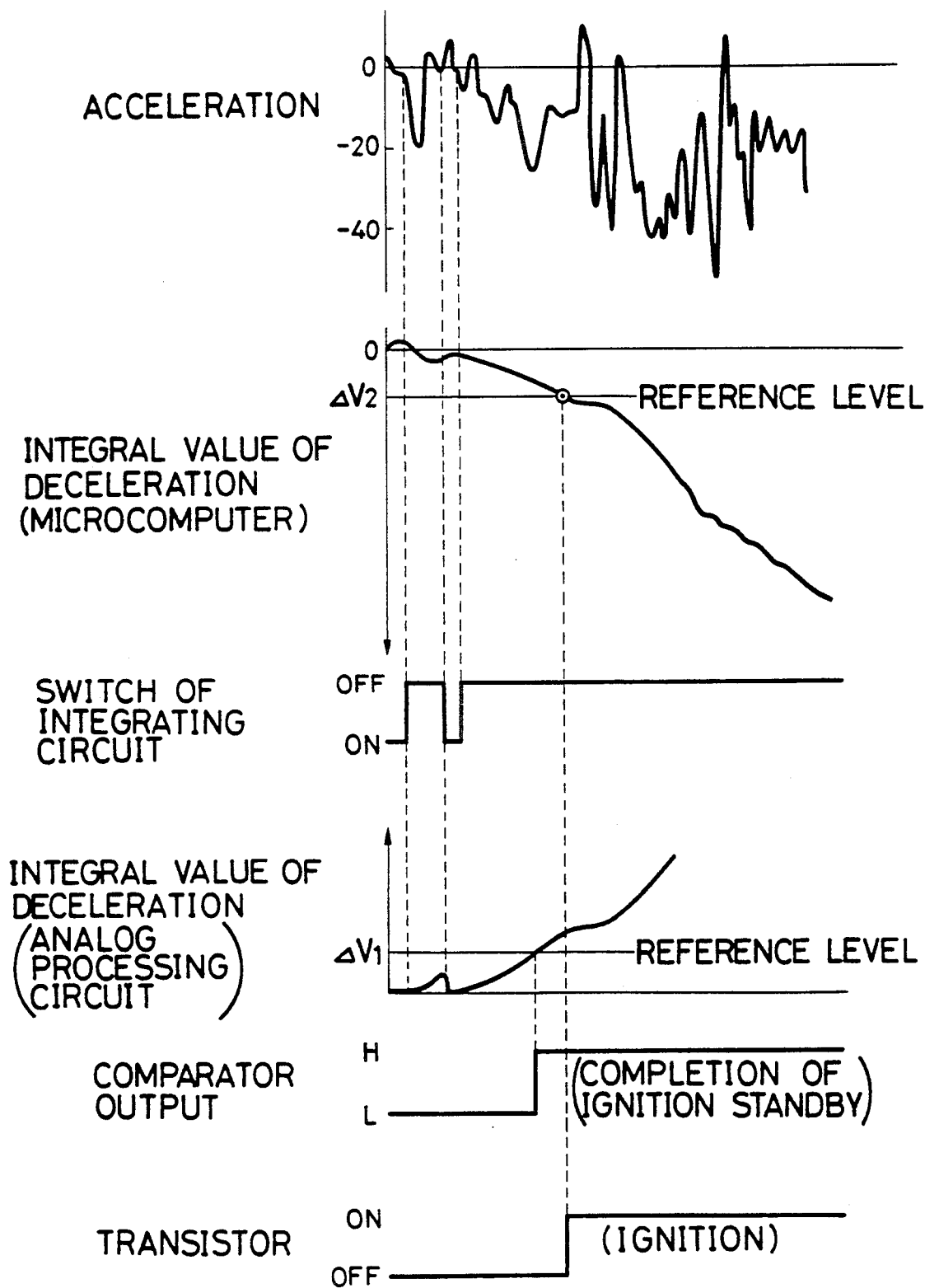

SYSTEM FOR CONTROLLING SAFETY DEVICE FOR VEHICLE

BACKGROUND OF THE INVENTION

This invention relates to a system for controlling a safety device for a vehicle, such as an air bag and a seat belt holding device.

Much attention has now been directed to an air bag as one effective means for protecting passengers against an impact due to collision of a vehicle. A control system for the air bag electrically detects the impact generated upon collision of the vehicle, and supplies electric current to a squib if the impact is above a predetermined level, thereby expanding the air bag.

Japanese Laid-Open (Kokai) Patent Application Nos. 55031/74 and 241467/88 disclose analog-type control systems. Such control system includes one acceleration sensor mounted on a vehicle. An analog deceleration signal from this acceleration sensor is fed to an integrating circuit where it is integrated, and this integral value is compared with a reference level at a comparator circuit. When the integral value exceeds the reference level, the comparator circuit outputs a collision decision signal to turn on a switching element, connected in series with a squib, to thereby supply electric current from a power source to the squib. In this conventional analog-type control system, however, the precision of the collision judgment or decision is not so high, and besides there is a possibility that due to oscillation, the collision decision signal may be outputted accidentally.

There is also known a control system in which the calculation of the above integral value as well as the comparison between the integral value and the reference value is performed by a microcomputer. In this control system, the impact due to the collision can be detected more precisely as compared with the analog-type control system. However, there is a possibility that the program runs away to produce a collision decision signal when pulse-like noises are inputted.

As described above, the conventional control systems of both the analog type and the digital type have the possibility of temporary malfunction, and therefore it has been desired to further improve the reliability of the air bag system.

A control system disclosed in Japanese Laid-Open Patent Application No. 207755/88 includes two comparator circuits for comparing two deceleration signals, fed respectively from two acceleration sensors, with a reference level to output two collision decision signals, and two switching elements responsive respectively to the two collision decision signals so as to be turned on. Only when the two switching elements are both turned on, electric current is supplied to a squib, and therefore the possibility of accidental activation of the squib can be extremely lowered.

SUMMARY OF THE INVENTION

It is an object of this invention to provide a vehicle safety device control system which detects a collision with high precision to operate a safety device, and eliminates the possibility of accidental activation of the safety device to thereby improve the reliability of the control system.

According to the present invention, there is provided a system for controlling a safety device for a vehicle, comprising:

(a) first and second switching means connected to a power source in serial relation to the safety device;

(b) first and second acceleration sensors for respectively producing analog deceleration signals representative of the deceleration of the vehicle;

(c) first and second analog processing circuits for respectively processing the deceleration signals fed respectively from the first and second acceleration sensors, each of the analog processing circuits including an integrating circuit for integrating a respective one of the deceleration signals, and a comparator circuit for comparing an integral value, outputted from the integrating circuit, with a first reference level and for outputting a first collision decision signal when the integral value exceeds the first reference value;

(d) first and second analog-to-digital converters for respectively converting the analog deceleration signals, fed respectively from the first and second acceleration sensors, into digital form;

(e) microcomputer means for performing calculations of integration of the deceleration respectively in accordance with the digitalized deceleration signals, fed respectively from the first and second digital-to-analog converters, to produce integral values, the microcomputer means comparing the integral values with a second reference level, and outputting second collision decision signals respectively from its first and second output ports when the integral values exceed the second reference level;

(f) first logic means for outputting a first instruction signal to turn on the first switching means when the first logic means simultaneously receives any two out of the two first collision decision signals from the two analog processing circuits and the two second collision decision signals from the first and second output ports of the microcomputer means; and (g) second logic means for outputting a second instruction signal to turn on the second switching means when the second logic means simultaneously receives the other two out of the two first collision decision signals and the two second collision decision signals.

BRIEF DESCRIPTION OF THE DRAWINGS

FIG. 2 is a time chart illustrative of the operation of the control system.

DESCRIPTION OF THE PREFERRED EMBODIMENT OF THE INVENTION

Figure 1:
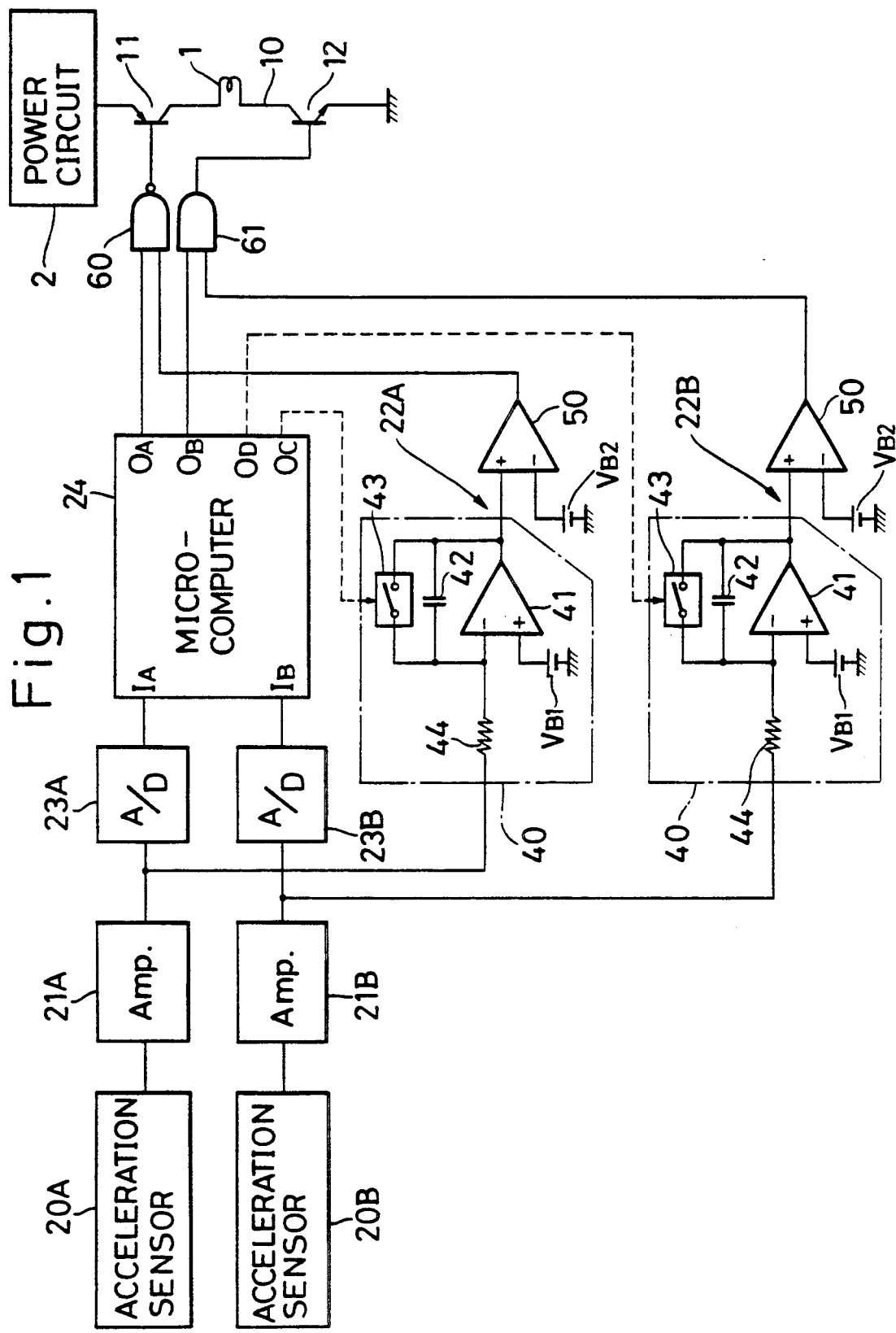
FIG. 1 is a block diagram of a system for controlling a safety device for a vehicle, provided in accordance with the present invention.

The invention will now be described with reference to the drawings. FIG. 1 shows a system for controlling an ignition squib 1 for expanding an air bag (safety device for a vehicle). This control system includes a feeder line 10 connected at one end to a power circuit 2 and connected at the other end to the ground. A first transistor (first switching element) 11, the squib 1 and a second transistor (second switching element) 12 are serially provided on the feeder line 10 in this order from the power circuit 2 toward the ground. The first transistor 11 is of the PNP type, and its emitter is connected to the power circuit 2, and its collector is connected to one terminal of the squib 1. The first transistor 11 is turned on when its base voltage goes to a low (L) level. The second transistor 12 is of the NPN type, and its emitter is grounded, and its collector is connected to the other terminal of the squib 1. The second transistor 12 is turned on when its base voltage goes to a high (H) level.

The control system includes first and second acceleration sensors 20A and 20B of the same characteristics mounted on the same portion of the vehicle. Each of the acceleration sensors 20A and 20B outputs an analog signal representative of the acceleration acting on the vehicle. The acceleration signals fed respectively from the two acceleration sensors 20A and 20B are amplified by amplifiers 21A and 21B, respectively. The output voltage of each of the amplifiers 21A and 21B is, for example, a positive detection reference voltage (2.5V) when the acceleration of the vehicle is zero, and is higher than the detection reference voltage when the vehicle is accelerated, and is lower than the detection reference voltage when the vehicle is decelerated. The absolute value of the difference between the output voltage of each of the amplifiers 21A and 21B and the detection reference voltage increases as the magnitude of the acceleration or the deceleration becomes greater.

The analog acceleration signals amplified respectively by the amplifiers 21A and 21B are fed respectively to first and second analog processing circuits 22A and 22B, and are also fed respectively to analog-to-digital (A/D) converters 23A and 23B to be converted into digital form, and then are inputted respectively to input ports $I_A$ and $I_B$ of a common microcomputer 24 of a one-chip type.

The microcomputer 24 contains separate programs for calculating the input data from the two acceleration sensors 20A and 20B independently of each other. The microcomputer 24 has first and second output ports $O_A$ and $O_B$ for outputting high-level collision decision signals (later described), respectively, in accordance with results of these calculations. The microcomputer 24 also has output ports $O_C$ and $O_D$ for outputting integration-initiating instruction signals (later described), respectively.

The two analog processing circuits 22A and 22B are of the same construction, and each of them comprises an integrating circuit 40 and a comparator (comparator circuit) 50. The integrating circuit 40 includes an operational amplifier 41, and a capacitor 42 and a switch 43 are connected in parallel between an output terminal and an inverted input terminal of the operational amplifier 41. A reference voltage $V_{B1}$ is supplied to a non-inverted input terminal of the operational amplifier 41. The reference voltage VB1 is equal to the detection reference voltage outputted from each of the amplifiers 21A and 21B when the acceleration is zero.

The signal from the first acceleration sensor 20A is inputted to the inverted input terminal of the operational amplifier 41 of the first analog processing circuit 22A via the amplifier 21A and a resistor 44. Similarly, the signal from the second acceleration sensor 20B is inputted to the inverted input terminal of the operational amplifier 41 of the second analog processing circuit 22B via the amplifier 21B and a resistor 44.

The output terminal of the operational amplifier 41 of each integrating circuit 40 is connected to a non-inverted input terminal of the corresponding comparator 50, and a reference voltage $V_{B2}$ (which is higher than $V_{B1}$) is supplied to an inverted input terminal of the comparator 50. When the integral output of the integrating circuit 40 exceeds the reference voltage $V_{B2}$, the comparator 50 outputs the highlevel collision decision signal.

The control system further comprises NAND circuit (first logic means) 60 and AND circuit (second logic means) 61. One input terminal of the NAND circuit 60 is connected to the first output port $O_A$ of the microcomputer 24, and the other input terminal of the NAND circuit 60 is connected to the output terminal of the comparator 50 of the first analog processing circuit 22A. An output terminal of the NAND circuit 60 is connected to the base of the first transistor 11. One input terminal of the AND circuit 61 is connected to the second output port $O_B$ of the microcomputer 24, and the other input terminal thereof is connected to the output terminal of the comparator 50 of the second analog processing circuit 22B. An output terminal of the AND circuit 61 is connected to the base of the second transistor 12.

Therefore, when the NAND circuit 60 simultaneously receives the high-level collision decision signals respectively from the comparator 50 of the first analog processing circuit 22A and the first output port $O_A$ of the microcomputer 24, the output of the NAND circuit 60 goes to a low level, and as a result the first transistor 11 is turned on. Also, when the AND circuit 61 simultaneously receives the high-level collision decision signals respectively from the comparator 50 of the second analog processing circuit 22B and the second output port $O_B$ of the microcomputer 24, the output of the AND circuit 61 goes to a high level, and as a result the second transistor 12 is turned on.

The operation of the air bag control system of the above construction will now be described with reference to FIG. 2. When an impact is applied to the vehicle, the two acceleration sensors 20A and 20B detect the deceleration due to this impact.

When the acceleration from the first acceleration sensor 20A becomes lower than about $-2G$ (G is the gravity acceleration), the microcomputer 24 initiates the integration of the deceleration. When the acceleration is in the range of between $-2G$ and $+2G$, the microcomputer 24 periodically subtracts such a value from the integral value that the integral value can become zero. Also, when the acceleration exceeds $+2G$, this acceleration is subtracted from the integral value. Thus, the integral value $\Delta V$ of the deceleration, that is, the speed variation $\Delta V$ representing the magnitude of the impact due to the collision, is calculated. When this integral value $\Delta V$ goes beyond a reference level $\Delta V_2$, the decision of the collision is made, and the high-level collision decision signal is outputted from the first output port $O_A$.

Similarly, the microcomputer 24 calculates an integral value based on the deceleration from the second acceleration sensor 20B, and when its integral value $\Delta V$ goes beyond a reference level $\Delta V_2$, the high-level collision decision signal is outputted from the second output port $O_B$.

Next, the operation of the analog processing circuits 22A and 22B will now be described in detail. In a normal condition, that is, when the vehicle is not subjected to an impact due to the collision, the switch 43 of the integrating circuit 40 is in the ON state to short-circuit the inverted input terminal and output terminal of the operational amplifier 41 together, and therefore the integration is not effected.

The integrating circuit 40 of each of the analog processing circuits 22A and 22B is responsive to the integration-initiating instruction signal from the microcomputer 24 to initiate the integrating operation. More specifically, when the acceleration from the first acceleration sensor 20A is kept below an auxiliary reference level ($-2G$) for a predetermined time period, the microcomputer 24 outputs the integration-initiating instruction signal from the output port $O_C$ so as to turn off the switch 43 of the first analog processing circuit 22A, thereby initiating the integrating operation of the integrating circuit 40. Similarly, when the acceleration from the second acceleration sensor 20B is kept below $-2G$ for a predetermined time period, the microcomputer 24 outputs the integration-initiating instruction signal from the output port $O_D$ so as to turn off the switch 43 of the second analog processing circuit 22B, thereby initiating the integrating operation of the integrating circuit 40.

When the acceleration from each of the acceleration sensors 20A and 20B is kept above a second auxiliary reference level (for example, $-1G$) for a predetermined time period, the microcomputer 24 outputs an integration-stopping instruction signal to the corresponding analog processing circuit 22A, 22B so as to turn on the switch 43. Because of hysteresis characteristics of such ON-OFF operation of the switch 43, the integrating operation is carried out in a stable manner.

The integral output, produced by the integrating circuit 40 of each of the analog processing circuits 22A and 22B, is compared with the reference voltage $V_{B2}$ of the comparator 50. The reference voltage $V_{B2}$ is set or determined in connection with a mathematical reference level $\Delta V_1$ (see FIG. 2) related to the integral value of the deceleration, and when the integral output exceeds the reference voltage $V_{B2}$, the comparator 50 outputs the high-level collision decision signal.

The reference level $\Delta V_1$ of the collision decision by the analog processing circuit 22A, 22B is lower than the reference level $\Delta V_2$ of the collision decision by the microcomputer 24. Therefore, when an impact due to the collision acts on the control system, the analog processing circuits 22A and 22B first make the collision decision, and then the microcomputer 24 makes the collision decision.

More specifically, upon collision of the vehicle, the high-level collision decision signal is first outputted from the comparator 50 of each of the analog processing circuits 22A and 22B, so that the control system is rendered into an ignition standby condition waiting for the collision decision signals from the microcomputer 24. Then, when the high-level collision decision signals are outputted respectively from the output ports $O_A$ and $O_B$ of the microcomputer 24, the output of the NAND circuit 60 is rendered to the low level to turn on the first transistor 11, and at the same time the output of the AND circuit 61 is rendered to the high level to turn on the second transistor 12. As a result, electric current is supplied to the squib 1 to expand the air bag.

Thus, the analog processing circuits 22A and 22B set the ignition standby condition, and then only when the collision decision signals obtained through the highly-precise calculations by the microcomputer 24 are outputted, the squib 1 is ignited. Therefore, the advantages of the microcomputer 24 can be fully used.

From the viewpoint of safety, the following advantages are achieved. Even when the microcomputer 24 runs away, the squib 1 will not be ignited unless both of the analog processing circuits 22A and 22B do not make the collision decision. It is hardly possible that both of the two analog processing circuits 22A and 22B output the collision decision signals due to the same temporary malfunction, and therefore even in the worst case, the squib 1 will not be ignited by accident.

The present invention is not restricted to the above embodiment, and various modifications can be made. For example, the AND circuit 61 may be omitted, in which case the base of the second transistor 12 is connected to the second output port $O_B$ of the microcomputer 24 and also to the output terminal of the comparator 50 of the second analog processing circuit 22B. These junction points serve as a substantial AND circuit (second logic means).

In the above embodiment, the number of the acceleration sensors as well as the number of the analog processing circuits may be more than two. Also, there may be used a plurality of microcomputers each making the collision decision in accordance with the signal from the corresponding acceleration sensor.

Further, the first transistor 11 may be responsive to the collision decision signals from the two output ports of the microcomputer so as to be turned on, and the second transistor 12 may be responsive to the collision decision signals from the two analog processing circuits so as to be turned on.

The reference voltages $V_{B2}$ (corresponding to the reference levels $\Delta V_1$ to be compared with the integral values of the deceleration) in the analog circuits 22A and 22B may be different from each other. Also, the reference levels $\Delta V_2$ to be compared, in the microcomputer, with the integral values based on the deceleration from the two acceleration sensors may be different from each other.

Further, in the above embodiment, although the present invention is applied to the air bag control system, the invention is applicable to other vehicle safety devices such as a seat belt holding device.

What is claimed is:

1. A system for controlling a safety device for a vehicle, comprising:
    (a) first and second switching means connected to a power source in serial relation to said safety device;
    (b) first and second acceleration sensors for respectively producing analog deceleration signals representative of the deceleration of said vehicle;
    (c) first and second analog processing circuits for respectively processing said deceleration signals fed respectively from said first and second acceleration sensors, each of said analog processing circuits including an integrating circuit for integrating a respective one of said deceleration signals, and a comparator circuit for comparing an integral value, outputted from said integrating circuit, with a first reference level and for outputting a first collision decision signal when said integral value exceeds said first reference value;
    (d) first and second analog-to-digital converters for respectively converting said analog deceleration signals, fed respectively from said first and second acceleration sensors, into digital form;
    (e) microcomputer means for performing calculations of integration of the deceleration respectively in accordance with said digitalized deceleration signals, fed respectively from said first and second digital-to-analog converters, to produce integral values, said microcomputer means comparing said integral values with a second reference level, and outputting second collision decision signals respectively from its first and second output ports when said integral values exceed said second reference level;

(f) first logic means for outputting a first instruction signal to turn on said first switching means when said first logic means simultaneously receives any one of said two first collision decision signals from said two analog processing circuits and one of said second collision decision signals from said first and second output ports of said microcomputer means; and (g) second logic means for outputting a second instruction signal to turn on said second switching means when said second logic means simultaneously receives the other one out of said two first collision decision signals and the other one of said two second collision decision signals.

2. A system according to claim 1, in which said first logic means outputs said first instruction signal when said first logic means simultaneously receives said first collision decision signal from said first analog processing circuit and said second collision decision signal from said first output port of said microcomputer means, said second logic means outputting said second instruction signal when said second logic means simultaneously receives said first collision decision signal from said second analog processing circuit and said second collision decision signal from said second output port of said microcomputer means.

3. A system according to claim 1, in which said second reference level to be compared with the integral value of the deceleration calculated by said microcomputer is higher than said first reference level to be compared with the integral value of the deceleration produced by said analog circuit.

4. A system according to claim 1, in which said microcomputer means comprises a one-chip type microcomputer.

5. A system according to claim 1, in which said microcomputer means make calculations in accordance with said deceleration signal from each of said acceleration sensors to determine whether or not results of said calculations meet a predetermined condition, said microcomputer outputting an integration-initiating instruction signal to a corresponding one of said analog processing circuits to initiate the integrating operation thereof when said predetermined condition is met.

6. A system according to claim 5, in which said integrating circuit comprises an operational amplifier, a capacitor connected to said operational amplifier in a negative feedback manner, and a resistor connected between an output of a respective one of said acceleration sensors and an inverted input terminal of said operational amplifier, said integrating circuit further comprising a normally-closed switch connected in parallel with said capacitor, and said switch being responsive to said integration-initiating instruction signal from said microcomputer means so as to be opened, thereby initiating the integrating operation of said integrating circuit.

7. A system according to claim 5, in which in accordance with said deceleration signal from each of said acceleration sensors, said microcomputer outputs said integrationinitiating instruction signal to said integrating circuit of a respective one of said analog processing circuits, when the deceleration of said vehicle is kept above a first auxiliary reference level for a first predetermined time period.

8. A system according to claim 7, in which in accordance with said deceleration signal from each of said acceleration sensors, said microcomputer outputs an integration-stopping instruction signal to said integrating circuit of a respective one of said analog processing circuits to stop the integration operation of said integrating circuit, when the deceleration of said vehicle is kept below a second auxiliary reference level lower than said first auxiliary reference level for a second predetermined time period.

* * * * *